(12) United States Patent
Kim (10) Patent No.: US 10,119,482 B1
(45) Date of Patent: Nov. 6, 2018

(54) METHOD FOR IGNITING FUELS IN ENGINES

(71) Applicant: Caterpillar Inc., Peoria, IL (US)

(72) Inventor: Charlie Chang-Won Kim, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/629,789

(22) Filed: Jun. 22, 2017

(51) Int. Cl.
| | |
|---|---|
| *F02D 19/06* | (2006.01) |
| *C10L 1/12* | (2006.01) |
| *F02B 1/12* | (2006.01) |
| *F02B 3/06* | (2006.01) |
| *F02P 23/04* | (2006.01) |
| *C10L 1/00* | (2006.01) |
| *F02P 23/00* | (2006.01) |

(52) U.S. Cl.
CPC ............ *F02D 19/06* (2013.01); *C10L 1/1258* (2013.01); *F02B 1/12* (2013.01); *F02B 3/06* (2013.01); *F02P 23/04* (2013.01); *C10L 1/00* (2013.01); *F02P 23/00* (2013.01)

(58) Field of Classification Search
CPC .... F02D 19/06; F02B 1/12; F02B 3/06; F02P 23/00; F02P 23/04; C10L 1/00; C10L 1/1258
See application file for complete search history.

(56) References Cited

U.S. PATENT DOCUMENTS

| | | | |
|---|---|---|---|
| 2,973,751 A | 3/1961 | Blackmer | |
| 2,992,638 A * | 7/1961 | Bloom, Jr. | ............... F02B 43/10 123/1 R |
| 3,969,899 A * | 7/1976 | Nakazawa | ............... F02B 47/06 110/206 |
| 3,985,107 A * | 10/1976 | Ueno | ....................... F02B 43/10 123/1 A |
| 4,290,392 A * | 9/1981 | Dissmore | ................ F02B 43/10 123/1 A |
| 6,230,683 B1 | 5/2001 | zur Loye et al. | |
| 7,464,688 B2 | 12/2008 | Yu et al. | |
| 7,832,372 B2 | 11/2010 | Blank | |
| 8,844,498 B2 * | 9/2014 | Patterson | ................ F02B 19/06 123/143 B |
| 8,936,007 B2 | 1/2015 | Nada | |
| 9,482,192 B2 | 11/2016 | Kim | |

FOREIGN PATENT DOCUMENTS

WO   2014027138   2/2014

* cited by examiner

*Primary Examiner* — Hieu T Vo (57) ABSTRACT

A method to ignite a fuel in an engine of an engine system is disclosed. The method includes introducing a mixture of air and a compound into a main combustion chamber of the engine. The compound includes a peroxide group. Next, the method includes controlling, by a controller, one or more parameters of the engine system to attain a temperature in the main combustion chamber within a temperature range. The compound decomposes into a radical within the temperature range. The method further includes injecting, by an injector, the fuel into the main combustion chamber upon the decomposition of the compound into the radical, causing an interaction of the fuel with the radical, thereby igniting the fuel.

20 Claims, 4 Drawing Sheets

METHOD FOR IGNITING FUELS IN ENGINES

TECHNICAL FIELD

The present disclosure relates to a method for igniting fuels in internal combustion engines. More particularly, the present disclosure relates to igniting fuels by use of a compound that has a peroxide group.

BACKGROUND

Internal combustion engines (or simply referred to as engines) are commonly applied as prime movers in a variety of applications and environments. Over the years, numerous attempts have been made to reduce emissions and to improve efficiency of such engines. For example, engine manufacturers and operators have proposed the need to combust leaner air-fuel mixtures for improving efficiency and use exhaust gas recirculation (EGR) to reduce emissions such as of Nitrogen Oxides (NOx).

In some situations, engines may apply high EGR and/or relatively leaner air-fuel mixtures. However, in such situations, conventional ignition systems associated with such engines may find it difficult to provide a stable, consistent combustion of the air-fuel mixture. For effective combustion in such situations, engines are required to have suitable provisions that facilitate adequate ignition. However, several of the currently available engines lack such provisions, and the engines that do, may incorporate encapsulated spark plugs or pre-chamber engine designs, with or without fuel enrichment or purging. Such provisions may help achieve a more robust and consistent ignition phenomenon, but the use of such provisions may require additional NOx treatment and extensive service. Further, some ignition strategies include the use of fuels, such as diesel, for providing a pilot ignition, but use of such strategies may produce particulate matter and soot, affecting engine emissions.

U.S. Pat. No. 7,464,688 ('688 reference) relates to an internal combustion engine that has compression temperatures and pressures that do not support auto-ignition of a fuel-air mixture. Ignition is achieved by injecting active radicals into the air-fuel mixture. The '688 reference also discloses that the active radicals are provided by withdrawing a portion of the air-fuel mixture, treating it to produce active radicals in the portion and returning the portion to the air-fuel mixture. Treatment of the portion typically includes simultaneously injecting, mixing, and compression of a predetermined amount of pilot fuel within the portion.

SUMMARY OF THE INVENTION

In one aspect, a method to ignite a fuel in an engine of an engine system is disclosed. The method includes introducing a mixture of air and a compound into a main combustion chamber of the engine. The compound includes a peroxide group. Thereafter, the method includes controlling, by a controller, one or more parameters of the engine system to attain a temperature in the main combustion chamber within a temperature range. The compound decomposes into a radical within the temperature range. Further, the method includes injecting, by an injector, the fuel into the main combustion chamber upon the decomposition of the compound into the radical, causing an interaction of the fuel with the radical, thereby igniting the fuel.

In another aspect, the disclosure relates to an engine system. The engine system includes an engine, a controller, and an injector. The engine includes an intake manifold and a main combustion chamber adapted to receive a mixture of air and a compound through the intake manifold. The compound includes a peroxide group. Further, the controller is configured to control one or more parameters of the engine system to attain a temperature in the main combustion chamber within a temperature range such that the compound decomposes into a radical within the temperature range. The injector is configured to inject a fuel into the main combustion chamber upon the decomposition of the compound into the radical, facilitating an interaction of the fuel with the radical and causing an ignition of the fuel.

In yet another aspect, the present disclosure is directed towards a method for operation of an engine of an engine system. The method includes introducing a mixture of air and hydrogen peroxide ($H_2O_2$) into a main combustion chamber of the engine. Thereafter, the method includes controlling, by a controller, one or more parameters of the engine system to attain a temperature in the main combustion chamber within a temperature range of 900 Kelvin to 1000 Kelvin. The compound decomposes into a hydroxyl (OH) radical within the temperature range. The method also includes injecting, by an injector, a fuel into the main combustion chamber upon the decomposition of the compound into the OH radical, causing an interaction of the fuel with the OH radical, thereby igniting the fuel.

DETAILED DESCRIPTION

Figure 1:
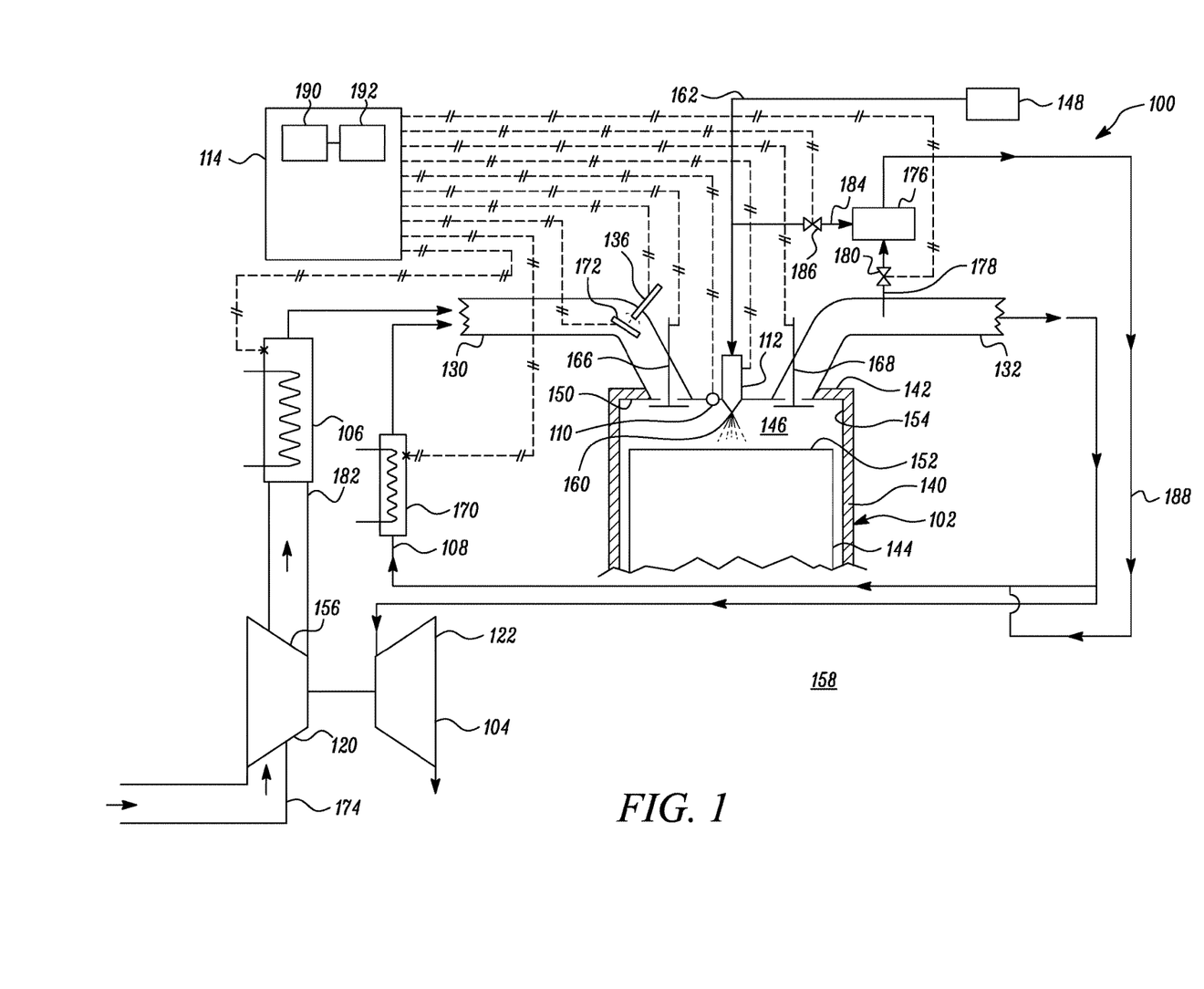
FIG. 1 is a schematic view of an engine system, in accordance with an aspect of the present disclosure.

Referring to FIG. 1 an engine system 100 is illustrated. The engine system 100 may be applied in a variety of machines, such as, but not limited to, excavators, loaders, dozers, compactors, paving machines, draglines, off-highway trucks, mining trucks, locomotives, and similar other machines, such as those that are applicable in a construction industry, including autonomous machines and semi-autonomous machines. In some implementations, aspects of the present disclosure may be extended to stationary power generating machines, and to machines that are applied in commercial and domestic environments. The engine system 100 includes an engine 102, a turbocharger 104, an intercooler 106, an exhaust gas recirculation (EGR) circuit 108, a sensor 110, an injector 112, and a controller 114. The turbocharger 104 further includes a compressor 120 and a turbine 122. Moreover, the engine 102 includes an intake manifold 130 and an exhaust manifold 132. Further, the engine 102 may also include a radical initiator (RI) 136. The RI 136 is configured to introduce a compound into the engine 102, facilitating a combustion of a fuel within the engine 102 when the compound converts or decomposes into a radical.

The engine 102 may be configured to receive a fuel, such as natural gas (or any of one or more components of natural gas), diesel, or hydrogen (Hz), for combustion. Optionally, the engine 102 may use any other suitable fuel, such as propane, gasoline, and the like, singularly or in combination with each other to power the engine's operation. The engine 102 may embody a V-type, an in-line, or a varied configuration as is conventionally known. The engine 102 may be a multi-cylinder engine, although aspects of the present disclosure are applicable to engines with a single cylinder as well, and although a single cylinder depiction is provided for the engine 102 in FIG. 1, the engine 102 may include multiple cylinders. Further, the engine 102 may be one of a two-stroke engine, a four-stroke engine, or a six-stroke engine. Although such configurations and working principles are disclosed, aspects of the present disclosure need not be limited to any particular engine type.

The engine 102 includes a cylinder 140, a cylinder head 142, and a piston 144 that may reciprocate within the cylinder 140. The cylinder 140 defines a main combustion chamber 146 within the cylinder 140, between the piston 144 and the cylinder head 142. More particularly, the main combustion chamber 146 is delimited by a flame deck surface 150 of the cylinder head 142, a piston crown 152 of the piston 144, and a surrounding wall 154 of the cylinder 140 (or a cylinder liner). In operation, the main combustion chamber 146 receives fuel for combustion according to a work cycle of the engine 102, facilitating the piston 144's movement and reciprocation within the cylinder 140, and thereby a subsequent production of power.

According to a strategy of the present disclosure, to attain combustion in the main combustion chamber 146, the main combustion chamber 146 is configured to receive the compound from the RI 136, mixed with an amount of compressed air (also simply referred to as air) from the turbocharger 104. A mixture of the compound with the air facilitates a combustion of a fuel that is introduced into the main combustion chamber 146 when the compound decomposes into a radical within the main combustion chamber 146, near a top dead center (TDC) of a compression stroke of the piston 144 (see exemplary position of the piston 144 at TDC in FIG. 1). A detailed working regarding the same will be set out later in the disclosure. For simplicity, the mixture of the compound with the air may be simply referred to as 'mixture', hereinafter.

The intake manifold 130 may be configured to facilitate passage to the mixture into the main combustion chamber 146. To this end, the intake manifold 130 may receive the air from the compressor 120 and the compound from the RI 136. To receive the air, the intake manifold 130 may be fluidly coupled to an outlet 156 of the compressor 120 of the turbocharger 104—so that air compressed and released by the compressor 120 may be received into the intake manifold 130. To receive the compound, the intake manifold 130 may accommodate the RI 136—the RI 136 may inject and introduce an amount of the compound directly into the intake manifold 130. In an embodiment, the compound may be injected and introduced into the intake manifold 130 according to a combustion cycle of the engine 102. In one embodiment, the RI 136 is positioned downstream to the compressor 120, and a mixing between the air and the compound may be homogenously attained within the intake manifold 130 itself, so as to form the mixture.

The exhaust manifold 132 may be configured to release residual products of combustion to an ambient 158 as exhaust gas. In the depicted embodiment, the exhaust gas is routed out to the ambient 158 through the turbine 122 of the turbocharger 104. Notably, a flow of the exhaust gas through the turbine 122 of the turbocharger 104 may drive the turbine 122 during a passage of the exhaust gas through the turbine 122. A drive of the turbine 122 may facilitate a drive of the compressor 120, in turn enabling the compressor to draw in air from the ambient, compress said air, and deliver the amount of compressed air (i.e. air) for mixing with the compound in the intake manifold 130, and then into the main combustion chamber 146, for facilitating combustion.

The injector 112 is configured to inject the fuel into the main combustion chamber 146. In one example, the injector 112 may be assembled into the cylinder head 142, and the injector's tip 160 (or nozzle) may be extended into the main combustion chamber 146 so as to facilitate a direct injection of the fuel into the main combustion chamber 146. The injector 112 may be fluidly coupled to one or more sources of the fuel, for example a fuel reservoir or a fuel tank 148, so as to receive the fuel thereof, and inject said fuel into the main combustion chamber 146, according to the combustion cycle of the engine 102. A dedicated fuel line 162 may be arranged between the fuel tank 148 and the injector 112 to facilitate fuel supply from the fuel tank 148 to the injector 112. In some embodiments, it is possible that the dedicated fuel line 162 may include a pump to provide power to a flow of fuel to the injector 112, and one or more valves so as to regulate said flow of the fuel to the injector 112.

Certain embodiments of the present disclosure contemplate the use of diesel as the fuel for combustion within the main combustion chamber 146, and since diesel may be used as a fuel, there remains a good chance for soot to be produced by the engine 102 as by-products of combustion. Particularly, a relatively high soot formation may be observed in zones, within a diesel combustion plume, where a relatively high (i.e. higher than a stoichiometric ratio) concentration of the fuel (i.e. diesel) is present, during combustion. According to one aspect of the disclosure, it may be noted that the introduced radical may oxidize a substantial portion of the soot within the main combustion chamber 146 itself, and may thus prolong a life of an associated aftertreatment system (not shown) of the engine system 100. In one implementation, it is possible to reduce soot also by increasing an injection pressure of the fuel. A relatively higher injection pressure of diesel may, for example, lessen the amount of soot production within the main combustion chamber 146. As a result, in one implementation, an injection pressure of diesel into the main combustion chamber 146 may be relatively increased and may take a value between 150 and 250 megapascal (MPa). Owing to a total oxidation of the soot within the main combustion chamber 146 by such methods, in some cases, it may be possible for aftertreatment systems to be altogether omitted from the engine system 100. In one example, a percentage of the compound, introduced with air into the main combustion chamber 146, is less than 2% by volume relative to a total volume of the mixture, and which is sufficient to oxidize the soot.

The RI 136 is configured to inject and/or introduce the compound into the intake manifold 130, as noted above. To this end, the RI 136 may be coupled to the intake manifold 130, as shown, and a tip of the RI 136 may protrude within the intake manifold 130, so as to facilitate injection of the compound into the intake manifold 130 (see schematic representation in FIG. 1). As with the injector 112, the RI 136 may also be configured to receive a quantity of the compound from a compound tank or a compound reservoir (not shown). For this purpose, a dedicated line may extend between such a reservoir and the RI so as to supply the compound to the RI 136 for introduction into the intake manifold 130. Since the intake manifold 130 is configured to also receive the air (compressed by the compressor 120), as noted above, the compound introduced into the intake manifold 130 may receive the air and be thoroughly and homogenously mixed with the air, within the intake manifold 130 itself, to form the mixture.

The compound facilitates an ignition of the fuel within the main combustion chamber 146 by conversion or decomposition of the compound into a radical, at a temperature that is within a temperature range. For example, the temperature range is defined between 900 Kelvin and 1000 Kelvin. An interaction between the fuel and the radical facilitates a break-down of the fuel, and thereby causes an ignition of the fuel. It may be noted that the fuel is injected by the injector 112 only after the compound has decomposed into the radical. According to one aspect of the present disclosure, the compound introduced by the RI 136 has a peroxide group. According to one aspect, therefore, the compound is Hydrogen Peroxide ($H_2O_2$), and the radical formed within the temperature range may be a hydroxyl (OH) radical. It may be noted that without the radical, in-cylinder temperature (i.e. a temperature within the cylinder 140) may not be high enough to ignite the fuel. Nevertheless, a combustion of the fuel may occur even at lower temperatures due to the presence of the radical. In general, references to 'compound' throughout the present disclosure means that the compound includes $H_2O_2$, or a combination of $H_2O_2$ and water ($H_2O$).

Further, the engine 102 includes one or more valves 166, 168. For example, the one or more valves include a first valve 166 and a second valve 168. In one implementation, the first valve 166 is an intake valve that may be adapted to regulate an entry of the air-compound mixture (i.e. the mixture) into the main combustion chamber 146 through the intake manifold 130, while the second valve 168 may be an exhaust valve adapted to regulate an exit of residual gases of combustion of the fuel out of the main combustion chamber 146 into the exhaust manifold 132. Although a single first valve 166 and a single second valve 168 are disclosed, multiple first valves 166 and multiple second valves 168 may be applied. Also, the first valve 166 may be interchangeably be referred to as intake valve 166, and the second valve 168 may be interchangeably be referred to as exhaust valve 168.

The intercooler 106 may be configured to cool an amount of compressed air delivered by the compressor 120 and enhance a volumetric efficiency of an intake air charge density (i.e. of the air being supplied by the compressor 120). In some implementations, and as shown, the intercooler 106 may be located downstream to the compressor 120, so as to have the air compressed by the compressor 120 lose a portion of heat before the air enters the main combustion chamber 146.

The EGR circuit 108 facilitates a control or a reduction of the amount of oxides of nitrogen (NOx) emissions resulting from the combustion of the fuel, by quenching a temperature of combustion within the main combustion chamber 146. For example, the EGR circuit 108 introduces oxygen-poor exhaust gas into the main combustion chamber 146, thereby lessening the temperature and reducing NOx formation, during combustion. The EGR circuit 108 may include an EGR cooler 170 to cool the exhaust gas introduced into the main combustion chamber 146. In some implementations, the EGR circuit 108 may be low pressure loop, a high pressure loop, an external or an internal EGR loop.

It may be noted that both the coolers 106, 170 (i.e. the intercooler 106 and the EGR cooler 170) may work on conventional heat exchange principles, and thus may be configured to cool a quantity of a fluid (including the compressed air passing through the intercooler 106 and the exhaust gas passing through the EGR cooler 170) before delivery to the main combustion chamber 146, for combustion. In one example, the coolers 106, 170 may have a stream of coolant flowing through a dedicated cooling circuit that may absorb heat from the associated media flowing through the coolers 106, 170 that need to be cooled. For instance, the associated media in the intercooler 106 may be the compressed air, and from the compressed air, heat may be absorbed by a coolant flowing through the intercooler 106. Similarly, the associated media in the EGR cooler 170 may be the exhaust gas that is routed back to the main combustion chamber 146 through the EGR circuit 108. From the exhaust gas, heat may be absorbed by a coolant that passes through the EGR cooler 170. In one implementation, a flow of coolants through each cooler 106, 170 may be powered by dedicated pumps (not shown). Additionally, each cooler 106, 170 may include a blower (not shown), for example, to dissipate heat absorbed by the coolants to the ambient 158. It may be noted that changing an outlet temperature of the coolers 106, 170 may result in a change of an in-cylinder temperature history, which would help control a time at which the radicals will be produced from the compound.

The sensor 110 may be accommodated within the cylinder head 142. In one example, the sensor 110 may be configured to detect a pressure condition within the main combustion chamber 146, during engine operation, and thus help compute a temperature within the main combustion chamber 146, at any given point in time. To this end, the sensor 110 may help establish a pressure history (or a pressure trace) within the main combustion chamber 146, based on which the temperature may be computed and attained, with such computations being known to those of skill in the art. In one example, the sensor 110 may be in the form of a piezoelectric element disposed within the cylinder head 142. Such an element may include strain gauges or other known pressure sensitive devices, that may react to a change in pressure in the main combustion chamber 146 and provide a signal indicative of said pressure to the controller 114.

With continued reference to FIG. 1, one or more aspects of the present disclosure contemplates the use of an onboard apparatus that helps generate the compound (i.e. $H_2O_2$). This onboard apparatus may include a combustor 176. The combustor 176 may be fluidly coupled to the exhaust manifold 132 via an exhaust line 178, and accordingly may be configured to receive an amount of the exhaust gas from the exhaust manifold 132. Valves 180, for a regulation of the flow of exhaust gas into the combustor 176 though the exhaust line 178, may be positioned on the exhaust line 178. Additionally, the combustor 176 may also be configured to receive a fuel from a fuel source, such as the fuel tank 148, although it is possible for the fuel source for the combustor 176 to be different from the fuel tank 148. Nevertheless, in cases where the same fuel is used for combustion within the main combustion chamber 146 and for reforming the compound within the combustor 176, a common fuel tank, such as the fuel tank 148, as shown, may be used. According to the depiction provided in FIG. 1, the dedicated fuel line 162 may supply the fuel for combustion into the main combustion chamber 146, while an auxiliary fuel line 184, extending from said dedicated fuel line 162 may direct a portion of the fuel from the dedicated fuel line 162 towards the combustor 176. A supply of fuel to the combustor 176 may be regulated by a valve 186 positioned on the auxiliary fuel line 184. In some implementations, however, the auxiliary fuel line 184 may extend directly from the fuel tank 148 as well, independent of the dedicated fuel line 162.

In one embodiment, a fuel applied for combustion within the main combustion chamber 146 may differ from a fuel applied for the reformation of the compound in the combustor 176. Accordingly, the engine system 100 may utilize a dual fuel scheme for facilitating combustion within the main combustion chamber 146. For the purposes of the forthcoming disclosure, the fuel applied for combustion in the main combustion chamber 146 may be referred to as a 'primary fuel', while the fuel applied for reforming the compound in the combustor 176 may be referred to as 'reformer fuel'. It is possible that the term 'fuel' may also be used throughout the application, and in such a case, it will be appreciated that the term 'fuel' may correspond to the 'primary fuel' applicable for combustion within the main combustion chamber 146, unless specified otherwise.

In the case where the primary fuel is different from the reformer fuel, the reformer fuel may be supplied to the combustor 176 by an altogether different auxiliary line, extending directly between a source of the reformer fuel and the combustor 176, while the primary fuel may be sourced from a different tank, by an altogether different line. Some examples of primary fuels applicable may include diesel, while it is also possible for the primary fuels to include Hydrogen ($H_2$), natural gas, etc. Similarly, examples of the reformer fuel may also include the same fuels—i.e. diesel, $H_2$, natural gas, etc. Effectively, any of the cited examples of the reformer fuel, may be applied alongside any of the cited examples of the primary fuels, to define the dual fuel scheme of the engine system 100.

The combustor 176 is configured to reform and generate the compound by facilitating a mixing of the reformer fuel, received from the auxiliary fuel line 184, with some portions of the exhaust gas received from the exhaust conduit through the exhaust line 178. Since the engine 102 may run on lean conditions, there may be a relatively high percentage of oxygen in the exhaust gas received into the combustor 176. The reformer fuel, such as diesel, received into the combustor 176 may be mixed and may react with the oxygen rich exhaust gas, and given the relatively higher temperatures of the exhaust gas, the compound such as $H_2O_2$, may be produced. The produced compound may be routed via a line 188, supplying the compound to the EGR cooler 170, and from the EGR cooler 170, further into the intake manifold 130 for mixing with the air, and then further into the main combustion chamber 146 for producing the radicals in the temperature range, in turn facilitating combustion of the primary fuel.

Although in one implementation, the present disclosure discloses the use of diesel for the generation of the compound, such as $H_2O_2$, it may be noted that such a compound may be produced by the combustor 176 by using other fuels as well, but with the application of similar principles of the reformation, as has been disclosed above. For example, these other fuels may include $H_2$, natural gas, etc. Further, it may be noted that the generation of the compound may be in the units of mole fraction, and as soon as a maximum (or any desired) amount of the compound is formed in the combustor 176, the compound may be released into the line 188 and diverted into the EGR cooler 170, since an extended residence time within the combustor 176 may cause an oxidation and consumption of the compound within the combustor 176 itself. In some implementations, the combustor 176 may include a catalyst, such as a positive catalyst, to accelerate a rate of reaction and quicken the generation of the compound.

In cases, where the primary fuel applied for combustion within the main combustion chamber 146 is $H_2$, a maximum amount of the compound (i.e. $H_2O_2$) applicable for the ignition of the $H_2$ may be 0.3% of the combined amount of the $H_2O_2$ and the fuel ($H_2$). In such a case, a corresponding equivalence ratio (also referred to as PHI) may range between 0.38 to 0.45—with this range exemplifying that there is more oxygen available per unit of fuel. It may be understood that the aspects of the present disclosure are not limited to any particular fuel type, and this is applicable for both the primary fuel and reformer fuel. It may also be noted that the aspects of the present disclosure are also applicable to engine systems where the compound is directly sourced from a tank, and where no reforming is performed.

The controller 114 is configured to control one or more parameters of the engine system 100 to attain a temperature in the main combustion chamber 146 within the temperature range enabling the injected compound to be decomposed into the radical within the temperature range. With the control of the parameters by the controller 114, and the temperature attainment, the radicals facilitate an ignition of the primary fuel upon an injection of the primary fuel into the main combustion chamber 146, as has been noted above. For example, the one or more parameters of the engine system 100 include an outlet temperature of the one or more coolers 106, 170.

The controller 114 may be coupled with the injector 112 and the RI 136 so as to control an injection of the primary fuel and the compound, respectively. For example, an injection from each of the injector 112 and the RI 136 may be established by way of a solenoid valve action, or a needle valve action, and such actions may be controlled by the controller 114. Accordingly, the controller 114 may vary an injection pressure of the primary fuel into the main combustion chamber 146 and may also vary an injection pressure of the compound into the intake manifold 130.

In an embodiment, the engine system 100 includes a heater 172 that may receive the compound. The heater 172 may be positioned within the intake manifold 130, and may face the RI 136, as shown in FIG. 1. The heater 172 may be controlled by the controller 114 and may be configured to receive energy from a source (such as the engine 102) to generate heat. The heat generated by the heater 172 may vaporize the compound received from the RI 136, making it easier for the compound ($H_2O_2$) to disassociate into radicals (OH radicals). This may be applicable when, for example, the compound received from the RI 136 is in liquid form, and/or if a temperature of the intake manifold 130 and/or the compound are relatively low. Additionally, a mixing of the compound with the air from the compressor 120 may be enhanced when the compound turns into vapor form. A vapor form of the compound also helps in avoiding undue accumulation of the compound in the intake manifold 130. Alternatively, a container, such as the compound reservoir, that may hold/store the compound may be configured to be heated, as well, to just below a boiling temperature of the compound. In an embodiment, the liquid compound may be heated to a temperature of equal to or above 100° C. so as to facilitate an introduction of the compound into the intake manifold 130 in vapor form. Although not limited, the heater 172 may be in the form of a flat plate, and may be made from a metal.

In one implementation, when the primary fuel and the reformer fuel are the same, an introduction of the reformer fuel into the combustor 176 may be attained through the auxiliary fuel line 184, and may be regulated by the valve 186, as have been noted above. The controller 114 may be coupled to the valve 186 to regulate the flow of the fuel to the combustor 176. This is to ensure that the reformer fuel introduced into the combustor 176 is fully utilized by the reforming process to produce the compound—and so that no excess reformer fuel is left after a compound production process is complete. In that way, a passage of any leftover volume of the excess reformer fuel in the combustor 176, into the intake manifold 130, may be effectively prevented. In some implementations, therefore, the controller 114 may be configured to regulate the valve 186 such that only a predefined quantity of the reformer fuel may be introduced into the combustor 176, and accordingly, the combustor 176 may operate only at a preset stoichiometric ratio.

The controller 114 may be in electronic communication with the sensor 110 to receive a pressure signals from the sensor 110. Pursuant to the receipt of the signals, the controller 114 may deduce a temperature in the main combustion chamber 146. For example, the controller 114 may include a memory 190 that may include a model or one or more predefined charts that may have values of temperature assigned against sensed pressure values provided by the sensor 110. Alternatively, a temperature in the main combustion chamber 146 may be deduced by analyzing an output temperature of the exhaust gas released through the exhaust manifold 132, and, in such a case, the controller 114 may tally the output temperature against pre-stored temperature values in the memory 190 of the controller 114 to deduce the temperature within the main combustion chamber 146.

Further, the controller 114 may be in communication with the first valve 166, the second valve 168, the EGR cooler 170, and the intercooler 106. In that way, the controller 114 may be configured to control one or more parameters of each of these elements/devices of the engine system 100 to attain a condition for combustion within the main combustion chamber 146.

In one implementation, the controller 114 is coupled to the pumps of the coolers 106, 170 so as to vary the pumping action of the coolants into one or more of the coolers 106, 170. For example, if it were deduced that the temperature of the main combustion chamber 146 is outside the temperature range (such as if the temperature exceeds an upper limit of the temperature range), the controller 114 may control the pumps to enhance a pumping action of the coolant, in turn facilitating a relatively cooled volume of compressed air and/or the exhaust gas to enter the main combustion chamber 146. In so doing, the temperature of the main combustion chamber 146 may be lowered to take a value within the temperature range, thus facilitating decomposition of the compound, into a radical, in turn facilitating the radical to break down the fuel injected into the main combustion chamber 146 and cause an ignition of the fuel.

In some implementations, the controller 114 may be coupled to the blowers of the coolers 106, 170. In that manner, the controller 114 may vary a blower speed of the blowers to vary an outlet temperature of the coolers 106, 170, and thus meet the temperature requirement within the main combustion chamber 146 that is suited for combustion.

In other implementations, principles of a Miller cycle (i.e. early/late inlet valve closing) may be used for in-cylinder temperature reduction and/or exhaust valve timing control for an in-cylinder temperature increase. To this end, the controller 114 may be coupled to the first valve 166 and/or the second valve 168, and may vary openings/closures of the first valve 166 and/or the second valve 168 to maintain the temperature of the main combustion chamber 146 within the temperature range. More particularly, during, or at an end of an exhaust stroke, the controller 114 may facilitate a delayed opening of the second valve 168 (or early closing of the second valve 168), thus causing a delayed release of the exhaust gas from the main combustion chamber 146 into the exhaust manifold 132. The controller 114 may also facilitate a delayed opening of the first valve 166 so that there may be a delay in the receipt of the cooled compressed air/exhaust gas into the main combustion chamber 146 (i.e. valve overlap is lowered). In so doing, a variation or a lowering of the temperature below the temperature range may be mitigated, and instead, the temperature may be maintained within the temperature range. Therefore, the one or more parameters of the engine system 100 may include a timing of the opening and closing of the first valve 166 (intake valve 166) and the second valve 168 (exhaust valve 168).

In an embodiment, in case of lowering the in-cylinder temperature, the first valve 166 may be opened as early as 480 degrees after combustion TDC or as late as 100 degrees before combustion TDC. Also, the first valve 166 may be opened as early as 310 degrees after combustion TDC. Further, the second valve 168 may be closed as late as 400 degrees after combustion TDC, while the second valve 168 may be opened as early as 130 degrees after combustion TDC. In all of these cases, a piston-to-valve clearance and air systems capability may alter the valve timings.

In one implementation, the first valve 166 may be closed late and/or early during a work cycle to control the temperature in the main combustion chamber 146. Similarly, a re-opening and/or a closure of the second valve 168 may be varied to increase temperature and in-cylinder residuals. In such a case, in-cylinder residuals change as well as volumetric efficiency reduction on the engine 102 may be achieved by reopening the second valve 168 when an exhaust pulse pressure is higher than an in-cylinder pressure.

The controller 114 may include power electronics, pre-programmed logic circuits, data processing circuits, associated input/output buses, volatile memory units, such as random access memory (RAM), non-volatile memory units, etc., to help process and store signals or data received from the sensor 110, for example. Such signals may be processed by a processor 192 of the controller 114. The controller 114 may be a microprocessor based device, or may be implemented as an application-specific integrated circuit, or other logic device, which provide controller functionality, and such devices being known to those with ordinary skill in the art. In some implementations, the controller 114 may form a portion of one of the engine 102's electronic control unit (ECU), or may be configured as a stand-alone entity. Further, the controller 114 may include an analog to digital converter (not shown) that may be configured to receive and convert signals of pressure received from the sensor 110, for example, for a processing by the controller's processor 192.

INDUSTRIAL APPLICABILITY

Instead of relying on thermal discharge/non-thermal discharge/laser ignition of the fuel, aspects of the present disclosure disclose an exemplary method for operating the engine 102, and, more particularly, for igniting the primary fuel in the engine 102 by use of a compound. This compound may be introduced first into the intake manifold 130, be mixed with the air received from the compressor 120, form a mixture with said air, and then said mixture may enter the main combustion chamber 146 for facilitating combustion. The compound has a peroxide group, and in one implementation, the compound is Hydrogen Peroxide ($H_2O_2$), as has been already noted above.

Figure 3:
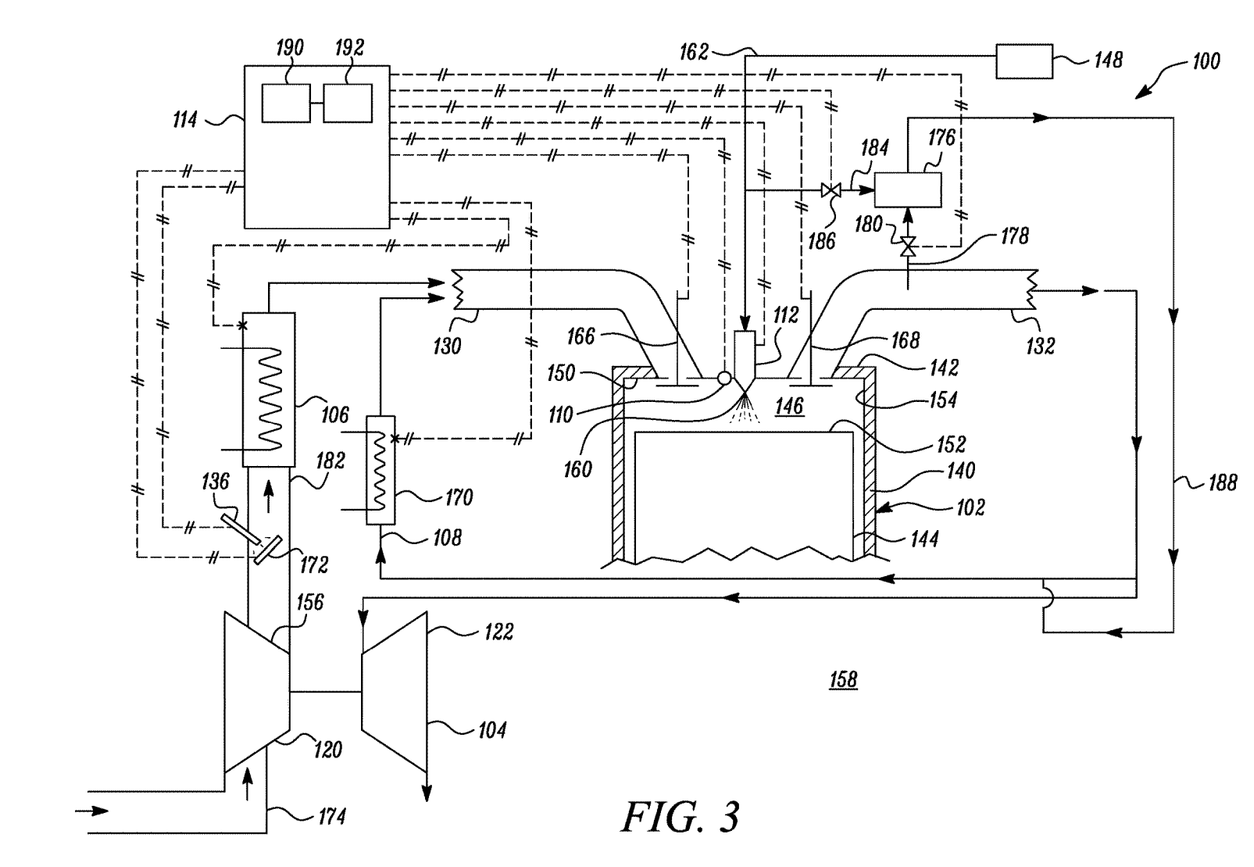
Figure 4:
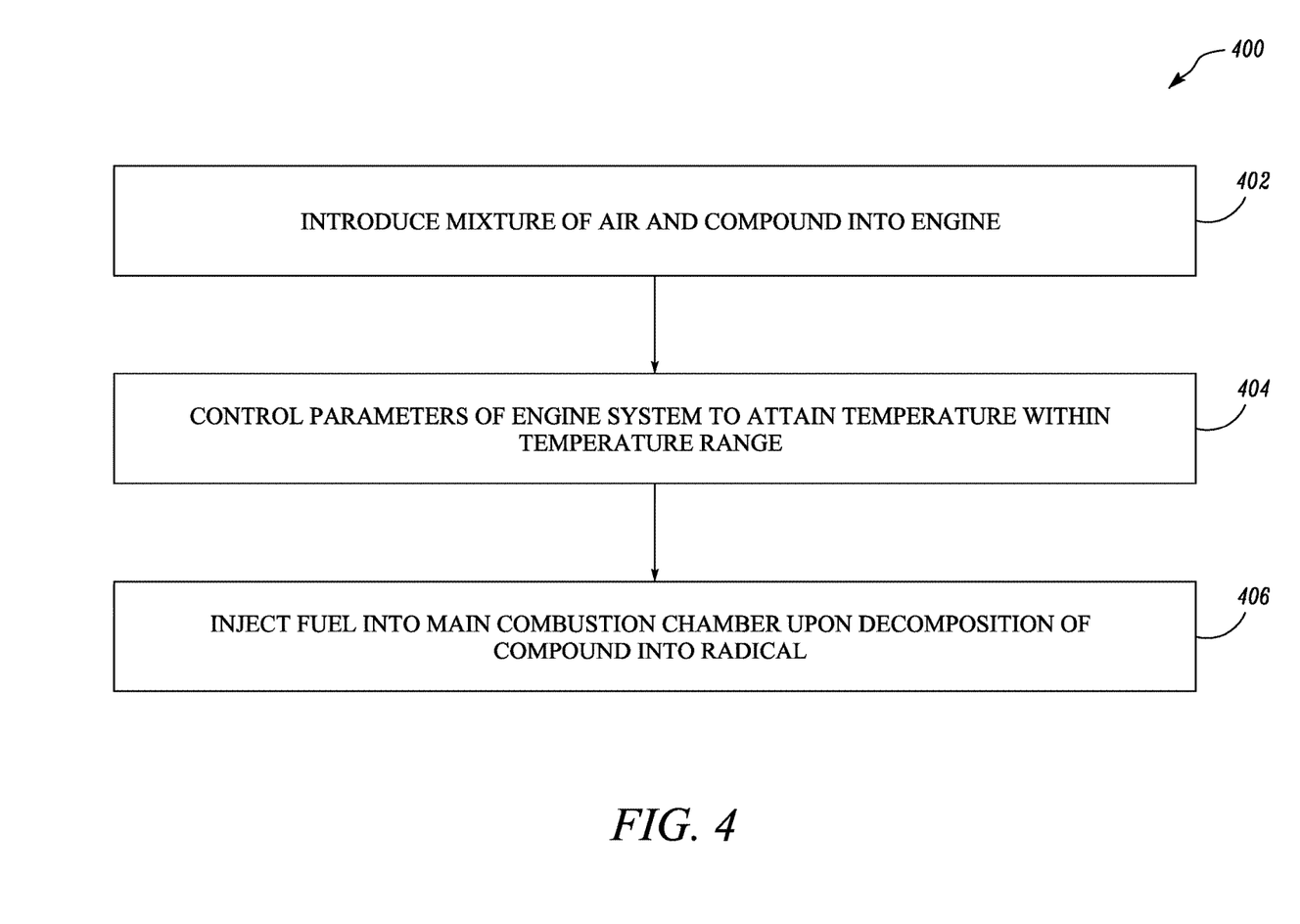
FIG. 4 is a flowchart illustrating an exemplary method for operation of an engine of the engine system, in accordance with an aspect of the present disclosure.

Referring to FIG. 4, this exemplary method is discussed in detail. Notably, this exemplary method has been described by way of a flowchart 400 and is discussed in conjunction with FIGS. 1, 2, and 3. The method starts at step 402.

At step 402, a mixture of air and the compound is introduced into the main combustion chamber 146 of the engine 102. For a formation of the mixture, an amount of the compound may be injected into the intake manifold 130, downstream to the compressor 120, as shown in FIG. 1. The injection may be in an atomized form. Since the compound may be in liquid form, the liquid compound may be vaporized. For example, in implementations where the engine system 100 includes the heater 172, the compound may be received by the heater 172, and the controller 114 may facilitate heat to be generated by the heater 172 to vaporize the liquid compound.

Figure 2:
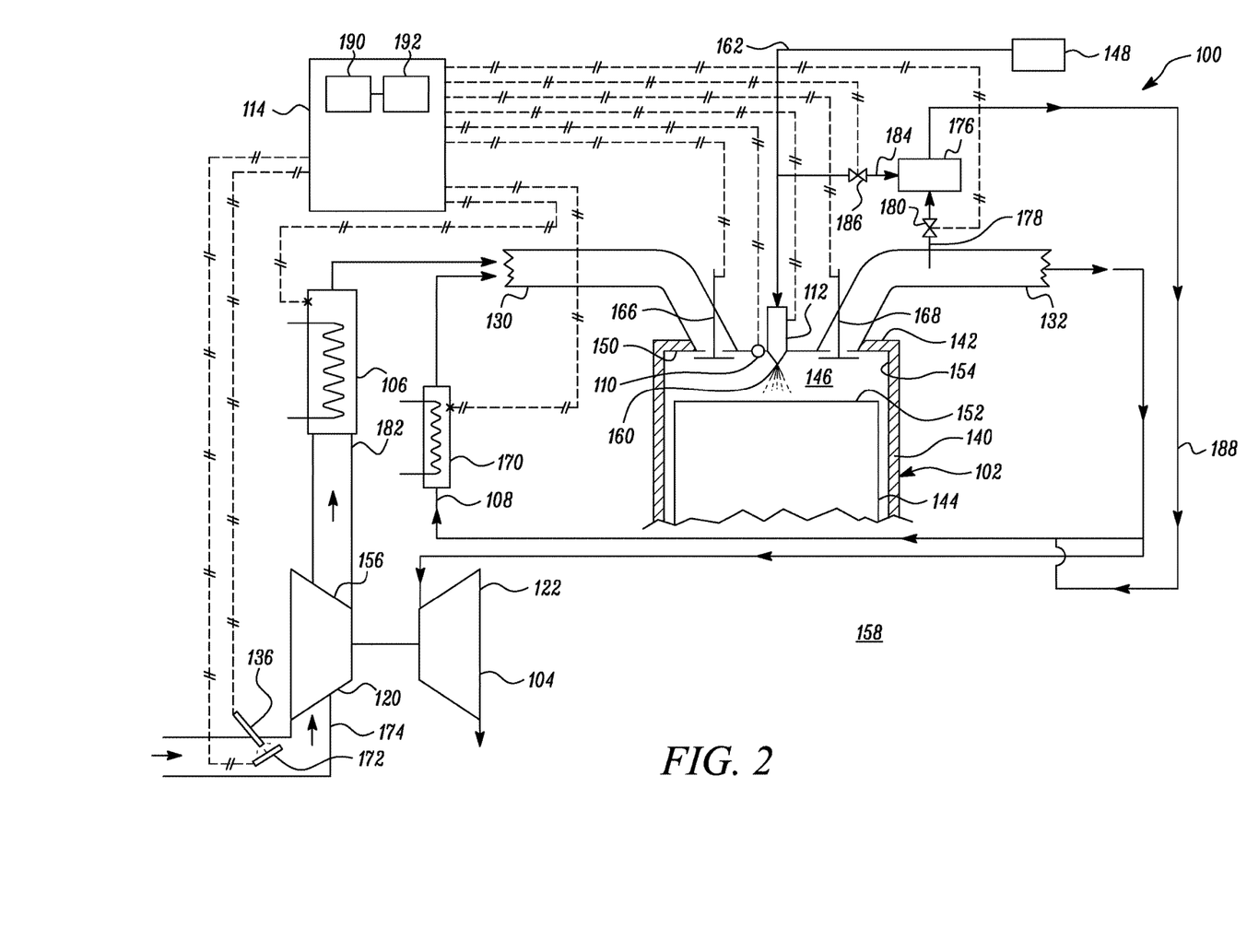
FIGS. 2 and 3 illustrate alternate embodiments of the engine system, in accordance with an aspect of the present disclosure.

Referring to FIG. 2, in an embodiment, the compound, in the liquid form, may be injected at an inlet 174 of the compressor 120. For this purpose, the RI 136 may be positioned at the inlet 174. Also, the heater 172 may be disposed at the inlet 174 such that the compound injected by the RI 136 into the inlet 174 is heated and vaporized by the heater 172.

Referring to FIG. 3, in another embodiment, the compound, in the liquid form, may be injected in an outlet conduit 182, downstream to the compressor 120 and upstream to the aftercooler 106. For this purpose, the RI 136 may be positioned within the outlet conduit 182, between the compressor 120 and the aftercooler 106, as shown. In one implementation, an injected compound may vaporize due to the heat of the air released by the compressor 120. This is because when the engine 102 is at load, a compressor outlet temperature may be high enough to vaporize the liquid compound without the use of any heating element (i.e. heater 172). Nonetheless, in some implementations, the heater 172 may still be applied, as shown, to provide supplementary heat, in case the heat from the air released by the compressor 120 were not sufficient to attain a vaporization of the compound.

As air compressed by an operation of the compressor 120 flows from the compressor 120 across the tip of the RI 136, the air entrains the injected compound (or the vaporized compound). Given the entrainment, a pressure from the compressor 120, and the atomized injection of the compound, a homogenous mixture of air and the compound is formed. Such mixing may occur within the intake manifold 130 itself. Further, as the piston 144 starts to execute a compression stroke, the first valve 166 may open either by a controller action, by a cam action, or both, allowing the pressurized homogeneous mixture of the compound and the air to be forced and introduced into the main combustion chamber 146 as the piston 144 nears the Top Dead Center (TDC). The method proceeds to step 404.

At step 404, the controller 114 determines the temperature within the main combustion chamber 146 by analyzing a signal received from the sensor 110, and determines whether the temperature within the main combustion chamber 146 is within the temperature range (or if there is a requirement for the temperature to fall within the temperature range). As has been noted earlier in the application, an exemplary temperature range may be 900 Kelvin to 1000 Kelvin. If it is determined by the controller 114 that the temperature has, or may fall out of the temperature range near TDC, the controller 114 controls one or more parameters of the engine system 100 such that the temperature within the main combustion chamber 146 returns to the temperature range.

For example, the one or more parameters of the engine system 100 include an outlet temperature of the coolers 106, 170. In further detail, the controller 114 may control an operation of the pumps of the coolers 106, 170 or the blowers of the coolers 106, 170 to vary an outlet temperature of the one or more coolers 106, 170, thereby attaining the temperature range within the main combustion chamber 146. In one example, the controller 114 may lower the pumping action of the pumps that power a flow of coolant within the coolers 106, 170 if it were detected that the temperature of the main combustion chamber 146 is falling below a lower limit of the temperature range. Similarly, if the temperature of the main combustion chamber 146 were detected to be increasing beyond an upper limit of the temperature range, the controller 114 may enhance the pumping action of such a pump. Although two coolers, the EGR cooler 170 and the intercooler 106 are shown, it is possible that the controller 114 may control only one of the said coolers 106, 170 to control and maintain a temperature of the main combustion chamber 146 within the temperature range.

Further, the one or more parameters of the engine system 100 may include a timing of opening and closing of the first valve 166 and the second valve 168. By varying (or controlling) a timing of opening and closing of the valves 166, 168, an in-cylinder temperature of the engine 102 may be manipulated. For example, by controlling the first valve 166, an entrance of a portion of compressed air cooled by the intercooler 106 may be delayed and the temperature of the main combustion chamber 146 be maintained within the temperature range. Once the controller 114 controls one or more of such parameters to return the temperature within the main combustion chamber 146 to the temperature range, the compound decomposes into the radical within the temperature range, and the method proceeds to step 406.

At step 406, the controller 114 controls the injector 112 to inject the fuel into the main combustion chamber 146 upon or only after the decomposition of the compound into the radical. The radical may interact with the injected fuel, break down the injected fuel, and thus may cause an ignition of the injected fuel, within the main combustion chamber 146. An ignition of the fuel causes the fuel to combust, producing residual products of said combustion. These residual products of combustion are later discharged from the main combustion chamber by an opening of the exhaust valve 168 into the exhaust manifold 132. The method ends at step 406.

According to the discussion provided in the present disclosure, it is possible that a portion of the exhaust gas is diverted into the exhaust line 178 for the reformation of the compound in the combustor 176. A working of the combustor 176 may remain similar to what has been described above. On occasions where no such combustor 176 is applied, it is possible that the compound is sourced from an independent compound reservoir.

By use of the compound, a need and/or a burden to use encapsulated spark plugs, multi-torch spark plugs, pre-chamber engine design, and/or diesel pilot ignition method is effectively avoided. This helps in a reduction of engine bulk and commensurate costs. Also, as a result, a durability concern associated with the encapsulated spark plugs/pre-chamber engine design is well addressed, and a need for providing a relatively high temperature combustion in a separate small chamber of the engine 102, to generate radicals, may be well avoided. Instead, it may be appreciated that the present disclosure relies on a relatively medium temperature reaction to generate radicals from a dissociation of the compound (i.e. $H_2O_2$ to OH radicals at approximately 900 Kelvin) near TDC, to facilitate combustion. Moreover, engine operational goals, including the reduction of emissions, such as of Nitrogen Oxide (NOx), may be more easily attained. On occasions when an engine with a pre-chamber engine design is applied, the mixture may be introduced into the pre-chamber, and the fuel may also be introduced into the pre-chamber once the compound within the mixture has turned into a radical, so as to facilitate a combustion of the fuel.

In case the engine 102 utilizes diesel as fuel for combustion within the main combustion chamber 146, the hydroxyl radical (i.e. the OH radical) achieved as a result of the decomposition of the compound ($H_2O_2$) not only facilitates a combustion of a volume of the directly injected diesel into the main combustion chamber 146, but also facilitates an oxidation of soot formed as a result of combustion of the diesel, within the main combustion chamber 146. As a result, there is lesser accumulation of soot on an associated particulate matter (PM) filter system, in turn reducing back pressure, and, releasing potentially lesser hydrocarbons, as emissions. In one implementation, approximately 40% (i.e. a range of 35% to 45%) EGR may be used in conjunction with the compound and a high fuel injection pressure (such as above 240 MPa), so as to avoid usage of a selective catalytic reduction (SCR) system and a PM filter system in the engine system 100. In an additional implementation, 40% EGR may reduce NOx levels to meet various emission standards, including off-road emission regulations.

In brevity, when applying a fuel (i.e. any of the exemplary fuels cited in the present disclosure) by the engine system 100, fuel may be directly injected into the main combustion chamber 146 only after the radicals are formed. This helps attain a normal, stable combustion, avoiding engine misfires, lesser coefficient of variance (COV), and a more predictable, manageable ignition of fuel, even at relatively high levels of EGR.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. An engine system, comprising:
    an engine having an intake manifold and a main combustion chamber adapted to receive a mixture of air and a compound through the intake manifold, wherein the compound includes a peroxide group;
    a controller configured to control one or more parameters of the engine system to attain a temperature in the main combustion chamber within a temperature range, wherein
        the compound decomposes into a radical within the temperature range; and
    an injector configured to inject a fuel into the main combustion chamber upon the decomposition of the compound into the radical, facilitating an interaction of the fuel with the radical and causing an ignition of the fuel.

2. The engine system of claim 1, wherein the compound includes one of a Hydrogen Peroxide ($H_2O_2$) or a combination of $H_2O_2$ and water ($H_2O$).

3. The engine system of claim 1 further including a heater that is configured to generate heat to vaporize the compound.

4. The engine system of claim 1 further including at least one cooler configured to cool the air, wherein the one or more parameters of the engine system include an outlet temperature of the at least one cooler.

5. The engine system of claim 1, wherein the engine includes one or more intake valves to regulate an entry of the mixture into the main combustion chamber through the intake manifold,
    wherein the one or more parameters include a timing of opening and closing of the one or more intake valves.

6. The engine system of claim 1, wherein the engine includes an exhaust manifold and one or more exhaust valves to regulate an exit of residual gases of combustion from the main combustion chamber through the exhaust manifold,
    wherein the one or more parameters include a timing of opening and closing of the one or more exhaust valves.

7. A method to ignite a fuel in an engine of an engine system, the method comprising:
    introducing a mixture of air and a compound into a main combustion chamber of the engine, the compound including a peroxide group;
    controlling, by a controller, one or more parameters of the engine system to attain a temperature in the main combustion chamber within a temperature range, wherein the compound decomposes into a radical within the temperature range; and
    injecting, by an injector, the fuel into the main combustion chamber upon the decomposition of the compound into the radical, causing an interaction of the fuel with the radical, thereby igniting the fuel.

8. The method of claim 7, wherein the radical is a hydroxyl (OH) radical.

9. The method of claim 7, wherein the compound includes one of a Hydrogen Peroxide ($H_2O_2$) or a combination of $H_2O_2$ and water ($H_2O$).

10. The method of claim 7, wherein the fuel is one of diesel, hydrogen, or natural gas.

11. The method of claim 7, wherein the engine system includes at least one cooler configured to cool the air, wherein the one or more parameters includes an outlet temperature of the at least one cooler.

12. The method of claim 7, wherein the engine includes an intake manifold and one or more intake valves to regulate an entry of the mixture into the main combustion chamber through the intake manifold,
    wherein the one or more parameters include a timing of opening and closing of the one or more intake valves.

13. The method of claim 7, wherein the engine includes an exhaust manifold, and one or more exhaust valves to regulate an exit of residual gases of combustion from the main combustion chamber through the exhaust manifold,
    wherein the one or more parameters include a timing of opening and closing of the one or more exhaust valves.

14. The method of claim 7, wherein a percentage of the compound is less than 2% by volume relative to a total volume of the mixture.

15. The method of claim 7, wherein the temperature range is defined between 900 Kelvin to 1000 Kelvin.

16. A method for operation of an engine of an engine system, the method comprising:
    introducing a mixture of air and hydrogen peroxide ($H_2O_2$) into a main combustion chamber of the engine;
    controlling, by a controller, one or more parameters of the engine system to attain a temperature in the main combustion chamber within a temperature range of 900 Kelvin to 1000 Kelvin, wherein the compound decomposes into a hydroxyl (OH) radical within the temperature range; and
    injecting, by an injector, a fuel into the main combustion chamber upon the decomposition of $H_2O_2$ into the OH radical, causing an interaction of the fuel with the OH radical, thereby igniting the fuel.

17. The method of claim 16, wherein a percentage of the $H_2O_2$ is less than 2% by volume relative to a total volume of the mixture.

18. The method of claim 16, wherein the engine system includes at least one cooler configured to cool the air, wherein the one or more parameters include an outlet temperature of the at least one cooler.

19. The method of claim 16, wherein the engine includes an intake manifold and one or more intake valves to regulate an entry of the mixture into the main combustion chamber through the intake manifold,
wherein the one or more parameters include a timing of opening and closing of the one or more intake valves.

20. The method of claim 16, wherein the engine includes an exhaust manifold, and one or more exhaust valves to regulate an exit of residual gases of combustion from the main combustion chamber through the exhaust manifold,
wherein the one or more parameters include a timing of opening and closing of the one or more exhaust valves.

* * * * *